US008832656B2

(12) United States Patent
Dahms et al.

(10) Patent No.: US 8,832,656 B2
(45) Date of Patent: Sep. 9, 2014

(54) TESTING SYSTEMS AND METHODS FOR A RESOURCE CONSTRAINED DEVICE

(75) Inventors: John F. A. Dahms, Waterloo (CA); David B. Howes, Waterloo (CA); Stephen D. Woodward, Cambridge (CA)

(73) Assignee: BlackBerry Limited, Waterloo (CA)

( * ) Notice: Subject to any disclaimer, the term of this patent is extended or adjusted under 35 U.S.C. 154(b) by 2102 days.

(21) Appl. No.: 11/220,820

(22) Filed: Sep. 7, 2005

(65) Prior Publication Data

US 2006/0077100 A1 Apr. 13, 2006

Related U.S. Application Data

(60) Provisional application No. 60/607,740, filed on Sep. 7, 2004.

(51) Int. Cl.
*G06F 9/44* (2006.01)
*H04M 1/24* (2006.01)
*G06F 11/36* (2006.01)
*H04W 24/06* (2009.01)
*H04W 24/00* (2009.01)

(52) U.S. Cl.
CPC ............... *G06F 11/362* (2013.01); *H04M 1/24* (2013.01); *H04W 24/06* (2013.01); *H04W 24/00* (2013.01); *G06F 11/3688* (2013.01)
USPC ............ 717/124; 717/126; 717/127; 717/148

(58) Field of Classification Search
USPC ......... 717/124–135, 139, 148, 151, 154, 158, 717/166; 455/419, 423, 425, 67.11–67.16
See application file for complete search history.

(56) References Cited

U.S. PATENT DOCUMENTS

| 5,815,653 | A | * | 9/1998 | You et al. ..................... 714/38 |
| 5,930,707 | A | | 7/1999 | Vambaris et al. |
| 6,434,364 | B1 | * | 8/2002 | O'Riordain ................ 455/67.11 |
| 6,542,167 | B1 | * | 4/2003 | Darlet et al. ................ 715/762 |
| 6,662,008 | B1 | | 12/2003 | Dolan et al. |
| 6,697,604 | B1 | | 2/2004 | Rimpelaet et al. |
| 2002/0072359 | A1 | | 6/2002 | Moles et al. |
| 2003/0110446 | A1 | | 6/2003 | Nemer |

(Continued)

FOREIGN PATENT DOCUMENTS

| EP | 0817031 | 1/1998 |
| WO | WO 02097619 A2 * 12/2002 ............ G06F 9/445 |

OTHER PUBLICATIONS

International Search Report of Application No. PCT/CA2005/001363, date of mailing Dec. 28, 2005—12pgs.

(Continued)

*Primary Examiner* — Satish Rampuria
(74) *Attorney, Agent, or Firm* — Jones Day

(57) ABSTRACT

Systems and methods for providing symbolic information about fields, methods, and/or classes for a target device. A system and method may be used where the runtime processing is split between a host system and a target system. At the target device a test program uses a symbol not defined on the target device. A query is sent from the target device to a symbolic information source. The symbolic information source then provides the target device with information about the undefined symbol. The target device uses the information from the symbolic information source to complete the test program.

28 Claims, 8 Drawing Sheets

(56) References Cited

U.S. PATENT DOCUMENTS

| | | | |
|---|---|---|---|
| 2004/0045019 A1* | 3/2004 | Bracha et al. | 719/332 |
| 2005/0005198 A1* | 1/2005 | Vakrat et al. | 714/37 |
| 2006/0036392 A1* | 2/2006 | Fay | 702/119 |
| 2006/0052080 A1* | 3/2006 | Vitikainen et al. | 455/403 |
| 2006/0073785 A1* | 4/2006 | Klassen et al. | 455/3.01 |

OTHER PUBLICATIONS

Extended European Search Report, issued Nov. 30, 2007 by European Patent Office, for European Patent App. No. 05779577.

Rahul Gupta et al, "Jini Home Networking: A Step Toward Pervasive Computing", IEEE Service Center, Los Alamos, CA, US, vol. 35, No. 8, Aug. 2002, pp. 34-40, XP011094664.

* cited by examiner

TESTING SYSTEMS AND METHODS FOR A RESOURCE CONSTRAINED DEVICE

CROSS-REFERENCE TO RELATED APPLICATION

This application claims priority to and the benefit of U.S. provisional application Ser. No. 60/607,740, filed on Sep. 7, 2004, of which the entire disclosure (including any and all figures) is incorporated herein by reference.

BACKGROUND

1. Technical Field

This document relates to the field of processor-based device testing environments. In particular, this document relates to providing symbolic information within a testing environment.

2. Description of the Related Art

Over the past several years, mobile devices have added ever increasing functionality in the form of applications installed on a mobile device. At the same time, the physical size of mobile devices has decreased dramatically. As such, these devices are often resource limited as a function of the applications provided with the mobile device and the physical size of the device. Due to the resource limitations of a mobile device, testing of software and other capabilities of the device can be limited.

BRIEF DESCRIPTION OF THE DRAWINGS

The same reference numerals are used in different figures to refer to similar elements.

DETAILED DESCRIPTION

The systems and methods disclosed herein may be utilized in many different types of environments. As an example of an environment, the virtual machine environment is used herein for discussing different approaches for handling undefined symbol(s). As way of background, the state of the art virtual machine is currently the Java™ virtual machine (JVM) from Sun Microsystems, Inc. (Sun). At the centre of Sun Microsystems Java™ technology is their Java™ virtual machine code, or byte code, as currently specified by the class file format in chapter 4 of the second edition of The Java™ Virtual Machine Specification by Tim Lindholm and Frank Yellin, Addison-Wesley Pub Co; ISBN: 0201432943.

Class file byte code co-operates with Sun's Java™ Runtime Environment (JRE) on the Solaris™, Win32, Linux™, Mac, and possibly other platforms. Typically, source code written in the Java™ programming language, is compiled into virtual machine byte code respecting the class file format by using a Java™ compiler, such as "javac", and then executed using the JRE or a compatible runtime environment and processing machine.

With reference to the Sun technique, various mechanisms provide program software byte code class files. For instance, a compiler compiles software into byte code class files. Alternatively, a web browser may use a software "plugin" to download software byte code class files.

Byte code in a class file usually references several other classes, each of which has a class file. For that reason, standard package class files are provided as a shared software resource to be re-used by instances of software. The JVM obtains class files and executes software and standard package class files.

Also included are the various systems on top of which the JRE operates. The standard packages in runtime define a particular runtime platform specified in an application programmer's interface (API).

The Java™ 2 Standard Edition (J2SE) is a Sun reference platform API. They also provide a reference implementation comprising a JRE configured with a set of standard packages running on the JVM. Application developers can write applications in the Java™ programming language referring to the J2SE standard package classes and may expect to have their applications run on J2SE compliant runtime systems. Other platforms exist which are usually defined by comparison to the J2SE. For instance, a superset of J2SE, the Java™ 2 Enterprise Edition (J2EE) adds further features. Of particular interest is a subset of J2SE, the Java™ 2 Micro Edition (J2ME).

Figure 1:
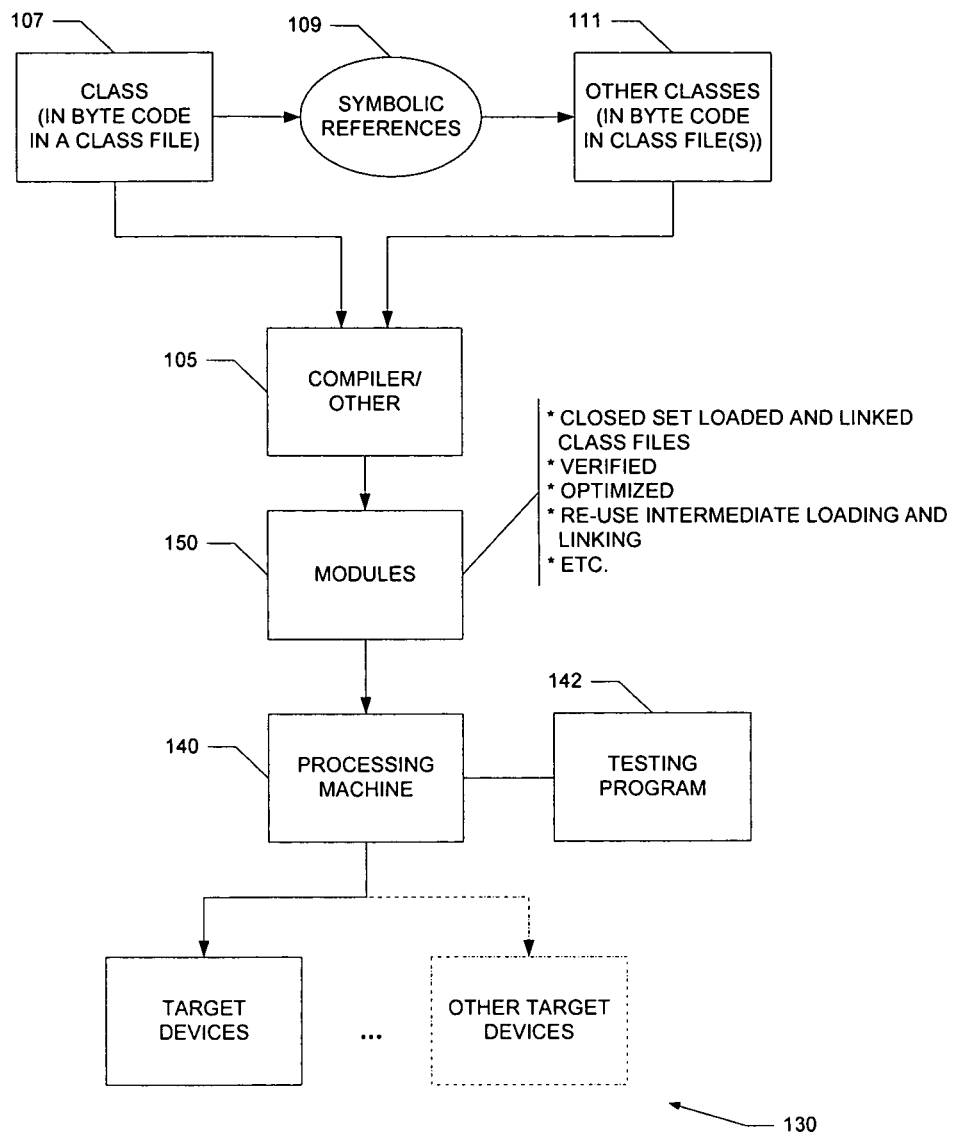
FIGS. 1, 2 and 3 are block diagrams illustrating an example split runtime system.

Although the J2SE platform may be well suited to operate on systems such as those illustrated by the Solaris™, Win32, Mac, Linux™, and other blocks 130 of FIG. 1, J2SE may not be well suited for operating on many devices. For instance, the class files of the standard J2SE packages may presently consume well over 16 Megabytes of disk space, which may exceed the storage capacity of many devices.

To address this problem, Sun introduced the Java™ 2 Micro Edition (J2ME) platform, additional virtual machines, and associated device configurations.

The Connected Limited Device Configuration (CLDC) and K Virtual Machine (KVM) address small consumer devices that you hold in your hand, with 128K to 512K of memory, and when used with the Mobile Information Device Profile (MIDP) may provide an application environment for devices such as cell phones and two-way pagers.

The Connected Device Configuration (CDC) and C Virtual Machine (CVM) address emerging, next-generation consumer devices with 2 MB or more of memory, and when used with the Foundation Profile (FP) may provide an application environment for next-generation consumer devices.

J2ME can be used with the aforementioned CLDC or CDC configurations, with the result that fewer standard class packages are stored on many devices as compared to J2SE. Therefore J2ME may take up less space on a device at the expense of not supporting all of the features of J2SE.

Although Java™ runtime technology may be available for different systems and devices, and although the J2ME platform addresses the limited storage space problem of devices by removing functionality, J2ME may not be considered an adequate solution since it may not address the efficiency of a device runtime implementation.

In order to better understand the present disclosure, the following information regarding Java runtime technology is provided. According to Lindholm et al., in section §2.17.1 of the Sun JVM spec: "The Java virtual machine starts execution by invoking the method main of some specified class and passing it a single argument, which is an array of strings. This causes the specified class to be loaded (§2.17.2), linked (§2.17.3) to other types that it uses, and initialized (§2.17.4)".

Therefore by specifying the name of a "main" class when starting the JVM, a class file will be loaded and execution of byte code instructions will begin at the static main entry point of that class file. Furthermore, referenced types, such as classes, used by the "main" class will be linked and initialized. Depending on the use of other classes by the "main" class file, significant runtime resources will be consumed in order to load and link used class files.

Java™ runtime technology provides that the runtime system load and link all required class files each time a "main" class is specified for execution, which may cause the precipitous consumption of resources on a target system such as a device.

A typical Java™ application has at least one "main" class file containing a static main entry point, as well as possibly having several supporting class files.

The following example Java™ program listing is considered next:

```
public class Hello {
    public static void main(String[ ] a) {
        System.out.println("Hello!");
        Bye.bye(a);
    }
}
public class Bye {
    public static void bye(String[ ] a) {
        System.out.println("Bye!");
    }
}
```

The above listing provides source code for two classes, Hello and Bye, each of which can be compiled into class file format in a way which is known to a person skilled in the art, such as by placing the source for each class in a Hello.java file and a Bye.java file and using the command "javac Hello.java Bye.java" to obtain a Hello.class file and Bye.class file.

The Hello class provides a static main entry point and is therefore suitable to be specified as a "main" class when starting the JVM.

A plurality of class files are available to the virtual machine. Each class file has symbolic information that is used by the virtual machine to resolve references to other used class files.

Typically, the Hello.class file is loaded first as it is specified when starting the JVM. The JVM then proceeds to execute byte code instructions at the main entry point of the loaded class. Since the Hello class uses several standard package classes, the class files for the used classes will be loaded and linked to the Hello class. The Object.class file will be loaded and linked to the Hello class. Similarly, the String.class file, System.class file, and other class files used by the Hello class are loaded and linked. The Hello class also uses the Bye class (a supporting class which is not a standard package class) so the Bye.class file will be loaded and linked.

Although not expressly shown in the drawings, when a class file is loaded and linked, any class files the loaded class uses might also be loaded and linked. For instance, in the case of the loaded supporting Bye class, it uses many of the same classes as the Hello class. Depending on when the Bye class is loaded- and linked, the Bye class may not have to load the class files that are common with classes also used and loaded by the Hello class. However, all classes used by Bye will ultimately have to be linked to Bye as well for Hello to be able to use the supporting Bye class. The situation is similar with standard package classes.

Figure 2:
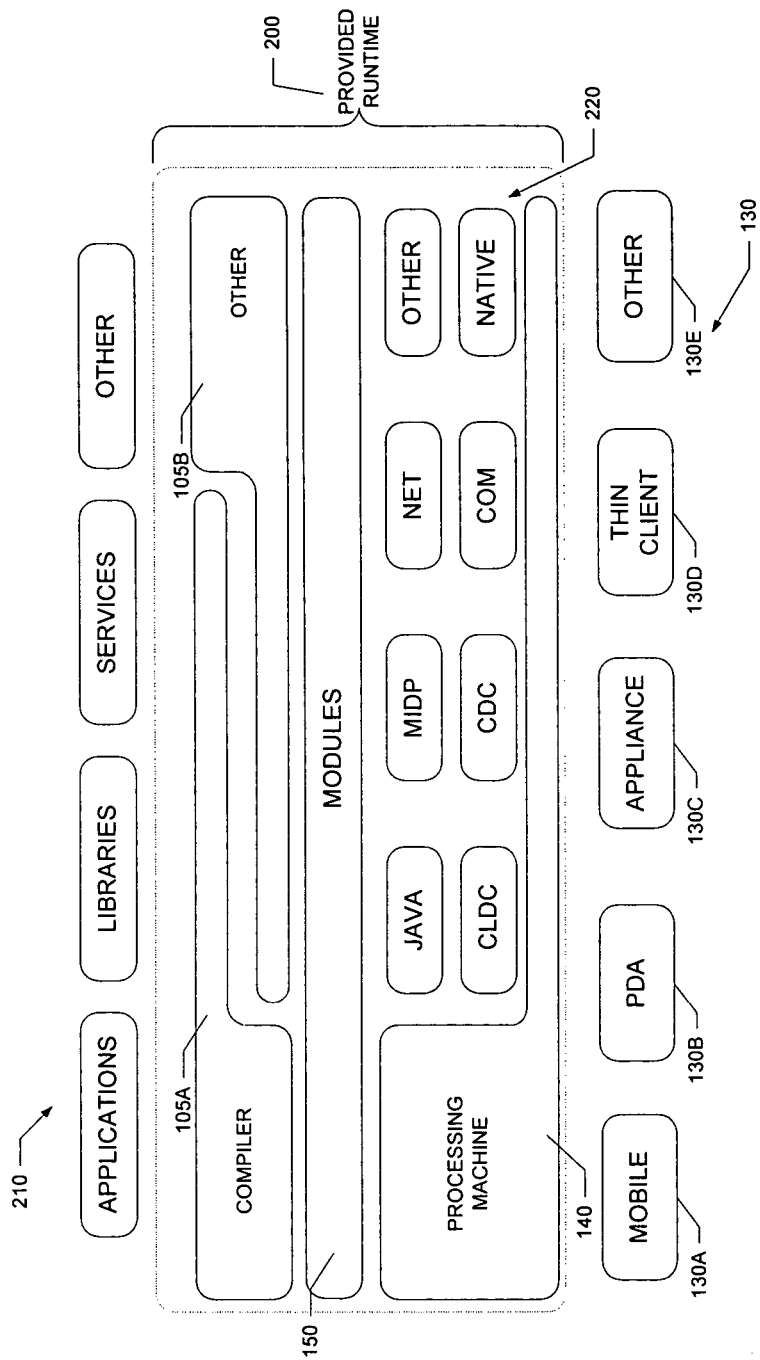
Figure 3:
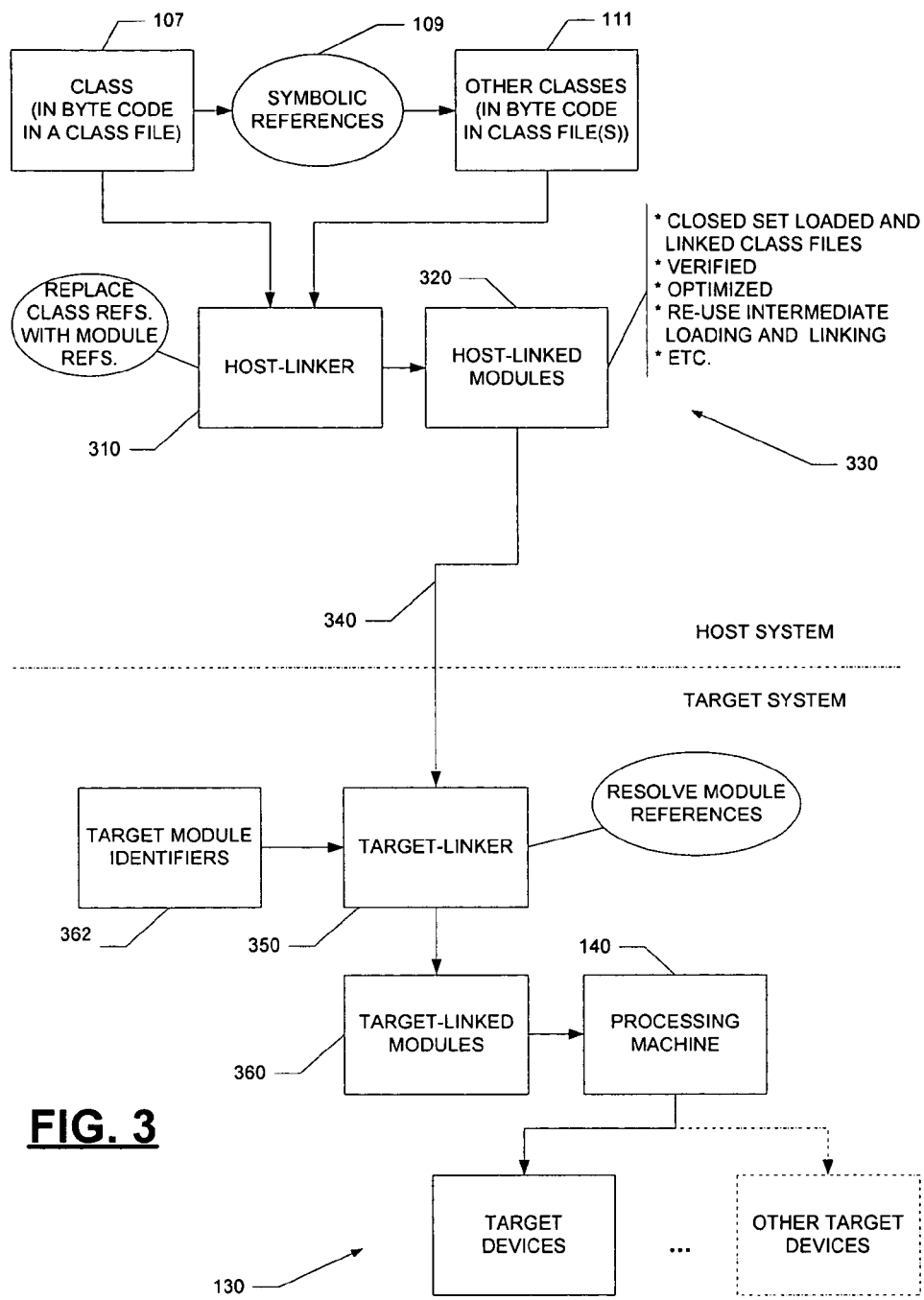

Traditional class file loading and linking consume significant runtime resources and may slow down the execution of a "main" program when loading and linking of class files is triggered by the specification of a command to execute a program, as is discussed in reference to FIGS. 1-3.

FIGS. 1-3 provide an example of contexts which can utilize the test interface systems and methods described herein. With reference to FIG. 1, instead of unlinked class files, a processing machine 140 executes modules 150 that include classes that have already been loaded and linked. More specifically, the modules 150 comprise the information found in closed set loaded and linked class files, thereby optimizing commands, symbolic information, and code size and speed for the target processing machine 140. Modules 150 allow the runtime to re-use the intermediate loading and linking work in multiple executions of main programs, instead of repeating this work at every execution. Modules 150 provide an alternative to execution triggered loading and linking.

A compiler 105A (or other mechanism 105B) receives a class file 107 which includes symbolic references 109 to other classes 111. The compiler 105A processes class files 107 and 111 which are in byte code such that the symbolic references 109 are resolved. The processed class files are provided to the processing machine 140 as modules 150. The processing machine 140 operates more efficiently on target devices 130 since typically the module size is substantially smaller than traditional runtime class files, for example, there may be a reduction approximately eight-fold in comparison to Java class file size. Also, module code can be verified once using sanity checks prior to multiple executions, thereby increasing subsequent execution speeds. Modules can be configured to minimize code communication, particularly useful in communication bandwidth-limited devices. Modules 150 can be configured to minimize code set up and execution time, which can be useful in runtime resource-limited devices. Modules 150 can be adapted to existing processing machine runtimes while maintaining compatibility with reference APIs, as FIG. 2 illustrates.

FIG. 2 illustrates an embodiment wherein various mechanisms 105A and 105B provide software 210. A compiler 105A compiles software 210. Alternatively, other mechanisms 105B can be used to download or otherwise obtain software 210. Standard class packages 220 are provided as a shared software resource to be re-used by instances of software 210. The processing machine 240 obtains classes and executes software 210 using standard class packages 220.

Also shown are various target devices 130 on top of which the processing machine 140 operates, such as a mobile device 130A, a personal data assistant (PDA) 130B, an appliance 130C, a thin client 130D, or other device 130E.

In FIG. 2, modules 150 have been introduced between the mechanism that provides software 210 and the processing machine 140 that executes machine code. The processing machine 140 however still uses the classes in the provided software 210 as well as the standard class packages 220, except that this is now done through the use of modules 150 rather than directly using class files. Class files can still be used as the compiler can take both class files and source files on its input and produce modules on its output.

Because of the presence of modules 150, the processing machine 140 need not be a virtual machine nor even know about the class file format, thereby optimizing performance at the target system by eliminating the need to load, link, and resolve class files. Further optimizations are possible if the provided runtime is split between a host system and a target device 130, as described in reference to FIG. 3.

FIG. 3 illustrates a split embodiment of a module-based runtime system. The class runtime processing is split between a host system 330 and a target system 130. The use of modules allows the runtime to be efficiently split between a host system and target device to optimize runtime efficiency at the target device.

In the host system 330 split runtime, class files (107 and 111) are host-linked at 310 into host-linked modules 320. The work of closed class file set analysis is offloaded to the host system 330. In the target system 130 split runtime, host-linked modules 320 are communicated at 340 from the host system 330, to be target-linked at 350 into target-linked modules 360. If any additional class resolution is needed on the target system 130, then the additionally needed target module identifiers 362 are target-linked at 350 with the host-linked modules 320 to form the target-linked modules 360. The processing machine 140 executes the target-linked modules 360.

The split Java™ virtual machine (JVM) machine code, or bytecode, which runs on the target device is a compressed and compacted version of the JVM bytecode which would be produced by standard editions of the JVM. This compressed and compacted JVM bytecode is missing much information that would typically be present in the standard bytecode, because the linking process 310, while pre-linking the class files into larger modules, also removes many of the symbolic names of private methods and fields, among others. Even the symbolic names of some of the classes are removed from this compressed bytecode.

Figure 4:
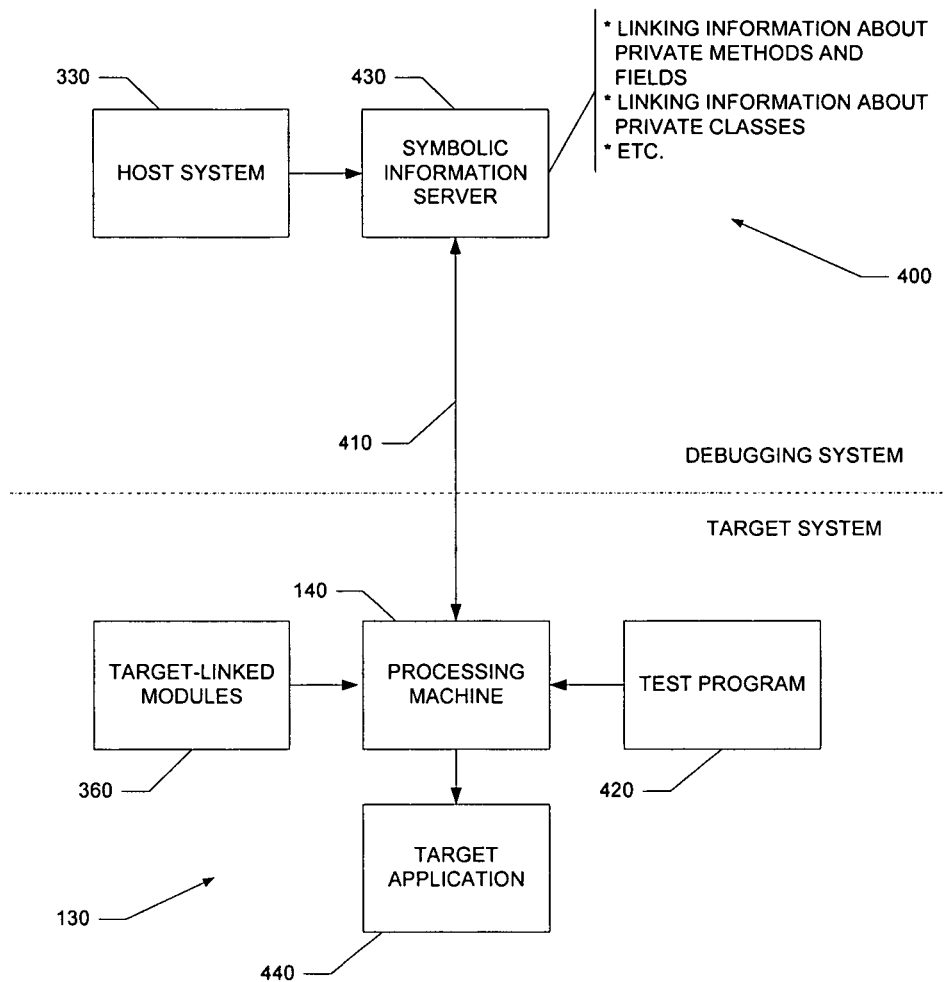
FIG. 4 is a block diagram illustrating a test interface for a split runtime target device.

FIG. 4 illustrates a system wherein a developer is unable to efficiently retrieve information about these private methods and fields from the mobile device 130A. With reference to FIG. 4, the system provides a test interface for a split JVM architecture so that a developer (or other user) can perform tests and retrieve information about these private methods and fields from the mobile device 130A. A target system 130 is connected to a debugging system 400 via connection 410. It should be noted that any commercially available debugging program would be suitable for use with the present invention. In some embodiments of the present disclosure, the connection 410 is a USB or serial connection. However, those skilled in the art should recognize that any transport layer protocol, wired or wireless, electrical, optic, or radio frequency, among others, could be used to communicate information between the target device and the debugging system. Moreover, it is intended that each such communication media/protocol be included within the scope of the present disclosure.

Further, the debugging system could be utilized with a computer, such as, but not limited to: personal computers, workstations, mainframe computers, etc. These computers can have a wide variety of operating systems and software installed.

The target system 130 includes a test program 420. The test program 420 can be loaded from the debugging system 400 via the connection 410. However, the testing program 420 can be transferred to the target system in numerous other ways, and that each of these ways are intended to be included within the scope of the present disclosure. The test program 420 can be an automated testing program which is operable to execute on the processing machine 140. The test program 420 may contain a list of commands which instruct the processing machine 140 to execute a target application 440 using a set of inputs provided by the test program 420. The target application 440 can include functions which are performed during normal operation of the target system 130, such as, for example, power-up, graphics operations, communications, among others.

Upon the target application 440 finishing the instructions sent by the test program 420, the test program 420 uses an interface, such as a reflection-type API of the JVM, to retrieve the values of various fields, methods, classes, etc. which are of interest. These various fields, methods, classes, etc. are of interest because the fields, methods, classes, etc. may be those that have been exercised by the test program 420. In other words, these fields, methods, classes, etc. are associated with the target application 440.

Although some of the symbolic information (e.g., naming information) is available to the target device from the target linked modules 360, the symbolic information for private fields, methods and classes may not be available to the target device 130 because, among other things, of the optimizations that occurred during the host-linking process (e.g., as described with reference to FIG. 3). Thus, these values cannot be retrieved by the target device 130.

The target device can be operable to determine whether the debugging system 400 is connected. The target device 130 is operable to send a query to a symbolic information server 430. In one embodiment of the present disclosure, all of the symbolic information is written into a file during the compiling and optimizing processes, and the symbolic information server 430 has access to all of the compile and linking information generated by the host system 330. Thus, the symbolic information server 430 is operable to retrieve symbolic information for a symbol which is undefined at the target device 130. The symbolic information server 430 sends this information to the target system 130, and the target system completes the operation using the symbolic information retrieved from the debugging system 400.

The symbolic information server 430, host system 330 and debugging system 400 may not be co-located. As an illustration, each of the components (symbolic information server 430, host system 330 and debugging system 400) can be independent, or co-located with the other components in any combination. If the components are separately located, the components could be connected via a communication medium.

Figure 5:
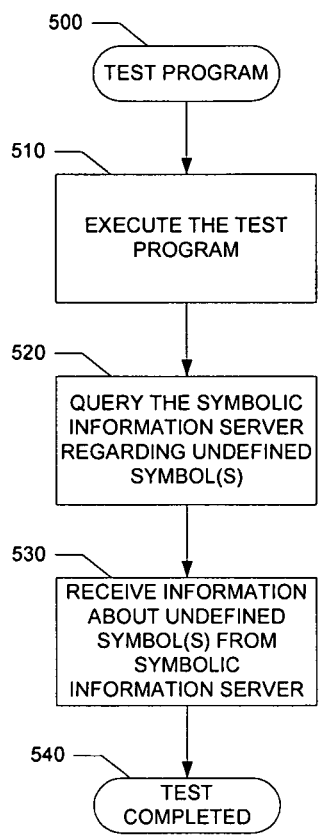
FIGS. 5 and 6 are flowcharts illustrating an operational scenario involving a test interface for a split runtime target device.

FIG. 5 shows a flowchart illustrating an operational scenario involving a testing interface of the target device 130. The operational scenario starts upon the test program 410 being called, as shown in step 500. The processing machine on the target system 130 begins executing the instructions contained within the test program 410 in accordance with step 510. In step 520, the target system 130 queries the symbolic information server 430 regarding an undefined symbol used within the test program 410. In step 530, the target system 130 receives a response from the debugging system 400. The response includes information about the undefined symbol queried by the target system 130. The target system 130 completes the test program 410, as shown in step 540.

Figure 6:
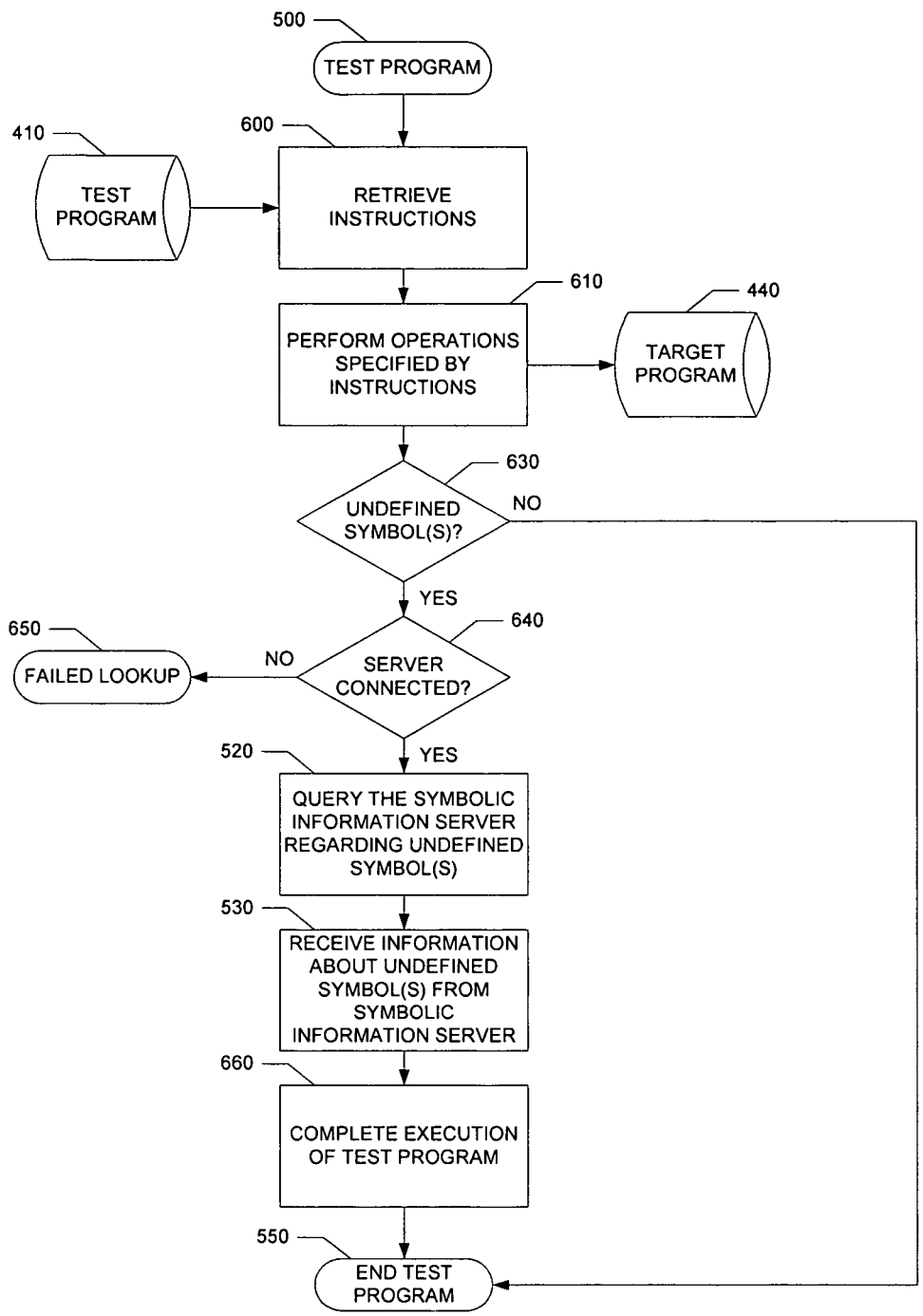

As another example of an operational scenario, FIG. 6 depicts a flowchart that starts at step 500. The target system 130 retrieves the instructions from the test program 410 in step 600. The target system 130 performs the operations as specified by the instructions contained within the test program 410, in accordance with step 610. Step 620 allows a system to account for the possibility that there may not be any undefined symbols located in the test program 410. In step 630, the target system 130 determines whether any undefined symbols are located within the test program 410. If there are no undefined symbols located within the test program 410, the flowchart proceeds ahead to complete the test program, as shown in step 550.

However, if there are unknown symbols located within the test program 410, the target system proceeds to step 640. At step 640, the target system determines whether a symbolic information server 430 is attached to the target system 130. The symbolic information server 430 can include information about some or all of the fields, methods, and classes which were used within the code before it was optimized and host-linked. If there is no symbolic information server 430 attached to the target system 130, the target system 130 proceeds to step 650 and throws an exception because the test program 410 was not resolved.

If a symbolic information server 430 is connected to the target system 130, the target system 130 sends a query to the symbolic information server 430 at step 520. The query from the target system 130 can comprise a request for information about the undefined symbol. The target system 130 then receives a response to the query in step 530. The response can include information about the undefined symbol. Using this information, the target system 130 completes execution of the test program 410, as shown by step 660. In step 550, the test program 410 ends.

It should be understood that similar to the other processing flows described herein, the steps and the order of the steps in the flowchart described herein may be altered modified and/or augmented and still achieve the desired outcome. For example the processing could also include the execution of more than one test program and/or more than one target program, the comparison of the results of the test program against expected results, etc.

Figure 7:
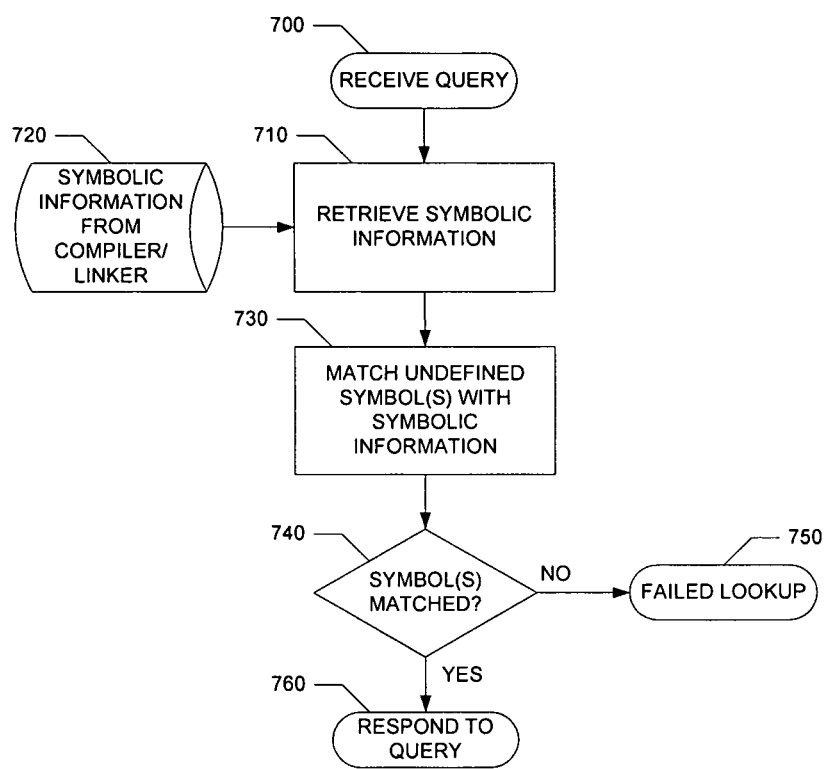
FIG. 7 is a flowchart illustrating an operational scenario involving retrieving symbolic information.

FIG. 7 illustrates an operational scenario involving a testing interface of the debugging system (e.g., the debugging system 400 of FIG. 4). The operational scenario begins with the debugging system 400 receiving a query from the target system 130, as shown in step 700. As mentioned above, the query includes information about at least one field, method or class which is not defined at the target system 130. The debugging system 400 is then operable to retrieve symbolic information 720 about the application from the compiler 105 (FIG. 1) and/or host-linker 310 (FIG. 3). Together the compiler 105 and host-linker 310 create files which document the optimization process, thus detailing which symbols were optimized out of the program.

At step 730, the debugging system 400 matches the undefined symbol with the symbolic information 720 retrieved from the compiler 105 and the host-linker 310. To do this, the debugging system 400 can use the information received from the target device 130 in the query to search the symbolic information 720 for the undefined symbol. It should be understood that there exist many searching techniques which are suitable for finding the symbol as well as the symbolic information associated with the symbol. If there is no matching symbol in step 740, the debugging system throws an exception as shown in step 750. However, if there is a matching symbol, the debugging system 400 sends a response to the target system 130 as shown in step 760. The response sent to the target system 130 includes the symbolic information associated with the undefined symbol which was located in step 730.

The systems and methods disclosed herein are presented only by way of example and are not meant to limit the scope of the invention. Other variations of the systems and methods described above will be apparent to those skilled in the art and as such are considered to be within the scope of the invention. For example, a system and method can be configured for operation upon a target mobile wireless communications device having a test interface. The device can include instructions that are operable to execute a test program on the target device. The test program can include test instructions and use a symbol that is undefined on the target device. The device can send the undefined symbol (e.g., information about the undefined symbol) to a symbolic information source. A response is received from the symbolic information source that includes information associated with the undefined symbol on the target device such that execution of the test program can be completed.

As another example, a system and method can be used where the runtime processing is split between a host system and a target device. At the target device a test program is executed. The test program includes a call for at least one symbol that is not defined on the target device. The target device then queries a symbolic information server regarding the classes that are not defined on the target device. The target device then receives a response from the symbolic information server including information about the classes that are not defined on the target device. The target device is then able to parse the call to the undefined class, and can provide the resulting information to a debugger.

Figure 8:
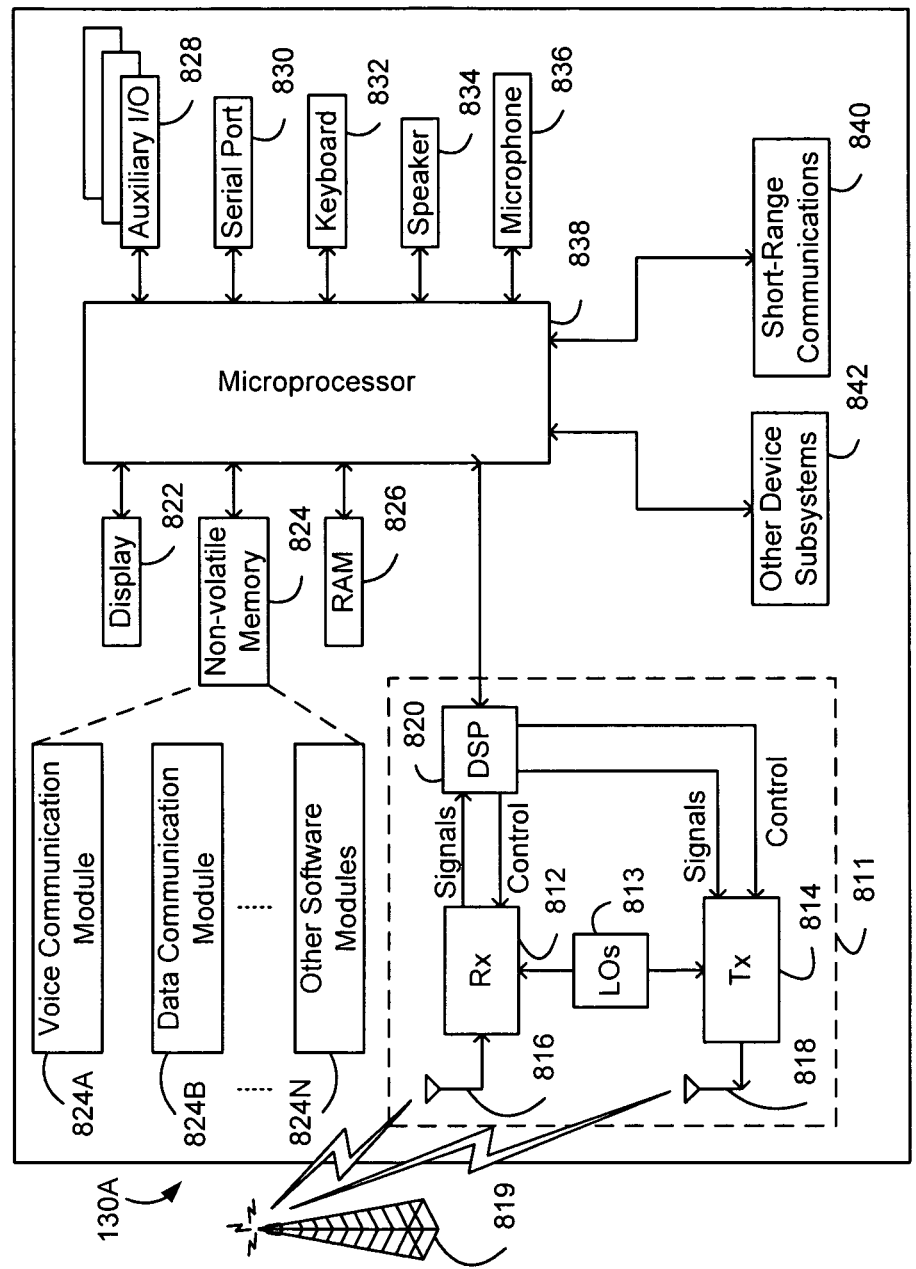
FIG. 8 is a block diagram of an example mobile device.

As yet another example of the wide scope of the systems and methods disclosed herein, the systems and methods may be used with many different types of computers and devices, such as a wireless mobile communications device shown in FIG. 8. With reference to FIG. 8, the mobile device 130A is a dual-mode mobile device and includes a transceiver 811, a microprocessor 838, a display 822, non-volatile memory 824, random access memory (RAM) 826, one or more auxiliary input/output (I/O) devices 828, a serial port 830, a keyboard 832, a speaker 834, a microphone 836, a short-range wireless communications sub-system 840, and other device sub-systems 842.

The transceiver 811 includes a receiver 812, a transmitter 814, antennas 816 and 818, one or more local oscillators 813, and a digital signal processor (DSP) 820. The antennas 816 and 818 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 8 by the communication tower 819. These voice and data networks may be separate communication networks using separate infrastructure, such as base stations, network controllers, etc., or they may be integrated into a single wireless network.

The transceiver 811 is used to communicate with the network 819, and includes the receiver 812, the transmitter 814, the one or more local oscillators 813 and the DSP 820. The DSP 820 is used to send and receive signals to and from the transceivers 816 and 818, and also provides control information to the receiver 812 and the transmitter 814. If the voice and data communications occur at a single frequency, or closely-spaced sets of frequencies, then a single local oscillator 813 may be used in conjunction with the receiver 812 and the transmitter 814. Alternatively, if different frequencies are utilized for voice communications versus data communications for example, then a plurality of local oscillators 813 can be used to generate a plurality of frequencies corresponding to the voice and data networks 819. Information, which includes both voice and data information, is communicated to and from the transceiver 811 via a link between the DSP 820 and the microprocessor 838.

The detailed design of the transceiver 811, such as frequency band, component selection, power level, etc., will be dependent upon the communication network 819 in which the mobile device 100 is intended to operate. For example, a mobile device 100 intended to operate in a North American market may include a transceiver 811 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 819, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 819, other than any legally required operations, such as '911' emergency calling.

After any required network registration or activation procedures have been completed, the mobile device 100 may the send and receive communication signals, including both voice and data signals, over the networks 819. Signals received by the antenna 816 from the communication network 819 are routed to the receiver 812, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 820. In a similar manner, signals to be transmitted to the network 819 are processed, including modulation and encoding, for example, by the DSP 820 and are then provided to the transmitter 814 for digital to analog conversion, frequency up conversion, filtering, amplification and transmission to the communication network 819 via the antenna 818.

In addition to processing the communication signals, the DSP 820 also provides for transceiver control. For example, the gain levels applied to communication signals in the receiver 812 and the transmitter 814 may be adaptively controlled through automatic gain control algorithms implemented in the DSP 820. Other transceiver control algorithms could also be implemented in the DSP 820 in order to provide more sophisticated control of the transceiver 811.

The microprocessor 838 preferably manages and controls the overall operation of the mobile device 100. Many types of microprocessors or microcontrollers could be used here, or, alternatively, a single DSP 820 could be used to carry out the functions of the microprocessor 838. Low-level communication functions, including at least data and voice communications, are performed through the DSP 820 in the transceiver 811. Other, high-level communication applications, such as a voice communication application 824A, and a data communication application 824B may be stored in the non-volatile memory 824 for execution by the microprocessor 838. For example, the voice communication module 824A may provide a high-level user interface operable to transmit and receive voice calls between the mobile device 100 and a plurality of other voice or dual-mode devices via the network 819. Similarly, the data communication module 824B may provide a high-level user interface operable for sending and receiving data, such as e-mail messages, files, organizer information, short text messages, etc., between the mobile device 100 and a plurality of other data devices via the networks 819. The microprocessor 838 also interacts with other device subsystems, such as the display 822, the RAM 826, the auxiliary input/output (I/O) subsystems 828, the serial port 830, the keyboard 832, the speaker 834, the microphone 836, the short-range communications subsystem 840 and any other device subsystems generally designated as 842.

Some of the subsystems shown in FIG. 8 perform communication-related functions, whereas other subsystems may provide "resident" or on-device functions. Notably, some subsystems, such as the keyboard 832 and the display 822 may be used for both communication-related functions, such as entering a text message for transmission over a data communication network, and device-resident functions such as a calculator or task list or other PDA type functions.

Operating system software used by the microprocessor 838 is preferably stored in a persistent store such as non-volatile memory 824. The non-volatile memory 824 may be implemented, for example, as a Flash memory component, or as battery backed-up RAM. In addition to the operating system, which controls low-level functions of the mobile device 810, the non-volatile memory 824 includes a plurality of software modules 824A-824N that can be executed by the microprocessor 838 (and/or the DSP 820), including a voice communication module 824A, a data communication module 824B, and a plurality of other operational modules 824N for carrying out a plurality of other functions. These modules are executed by the microprocessor 838 and provide a high-level interface between a user and the mobile device 100. This interface typically includes a graphical component provided through the display 822, and an input/output component provided through the auxiliary I/O 828, keyboard 832, speaker 834, and microphone 836. The operating system, specific device applications or modules, or parts thereof, may be temporarily loaded into a volatile store, such as RAM 826 for faster operation. Moreover, received communication signals may also be temporarily stored to RAM 826, before permanently writing them to a file system located in a persistent store such as the Flash memory 824.

An exemplary application module 824N that may be loaded onto the mobile device 100 is a personal information manager (PIM) application providing PDA functionality, such as calendar events, appointments, and task items. This module 824N may also interact with the voice communication module 824A for managing phone calls, voice mails, etc., and may also interact with the data communication module for managing e-mail communications and other data transmissions. Alternatively, all of the functionality of the voice communication module 824A and the data communication module 824B may be integrated into the PIM module.

The non-volatile memory 824 preferably also provides a file system to facilitate storage of PIM data items on the device. The PIM application preferably includes the ability to send and receive data items, either by itself, or in conjunction with the voice and data communication modules 824A, 824B, via the wireless networks 819. The PIM data items are preferably seamlessly integrated, synchronized and updated, via the wireless networks 819, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 826. Such information may instead be stored in the non-volatile memory 824, for example, when storage intervals are relatively short, such that the information is removed from memory soon after it is stored. However, storage of this information in the RAM 826 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 830 of the mobile device 100 to the serial port of a computer system or device. The serial port 830 may also be used to enable a user to set preferences through an external device or software application, or to download other application modules 824N for installation. This wired download path may be used to load an encryption key onto the device, which is a more secure method than exchanging encryption information via the wireless network 819. Interfaces for other wired download paths may be provided in the mobile device 100, in addition to or instead of the serial port 830. For example, a USB port would provide an interface to a similarly equipped personal computer.

Additional application modules 824N may be loaded onto the mobile device 100 through the networks 819, through an auxiliary I/O subsystem 828, through the serial port 830, through the short-range communications subsystem 840, or through any other suitable subsystem 842, and installed by a user in the non-volatile memory 824 or RAM 826. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 811 and provided to the microprocessor 838, which preferably further processes the received signal in multiple stages as described above, for eventual output to the display 822, or, alternatively, to an auxiliary I/O device 828. A user of mobile device 100 may also compose data items, such as e-mail messages, using the keyboard 832, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 828, which may include a thumbwheel input device, a touchpad, a variety of switches, a rocker input switch, etc. The composed data items input by the user may then be transmitted over the communication networks 819 via the transceiver module 811.

When the mobile device 100 is operating in a voice communication mode, the overall operation of the mobile device is substantially similar to the data mode, except that received signals are preferably be output to the speaker 834 and voice signals for transmission are generated by a microphone 836. Alternative voice or audio I/O subsystems, such as a voice message recording subsystem, may also be implemented on the mobile device 100. Although voice or audio signal output is preferably accomplished primarily through the speaker 834, the display 822 may also be used to provide an indication of the identity of a calling party, the duration of a voice call, or other voice call related information. For example, the microprocessor 838, in conjunction with the voice communication module and the operating system software, may detect the caller identification information of an incoming voice call and display it on the display 822.

A short-range communications subsystem 840 is also included in the mobile device 100. The subsystem 840 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

As another example of the broad scope, the systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

It is further noted that the systems and method may include data signals conveyed via networks (e.g., local area network, wide area network, internet, etc.), fiber-optic medium, carrier waves, wireless networks, etc. for communication with one or more data processing devices. The data signals can carry any or all of the data disclosed herein that is provided to or from a device.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

To further illustrate the broad scope of the system and method, the following is provided. Virtual machine code is usually interpreted by software. However, a virtual machine code processor can be implemented in hardware. Adaptation of the system and method to a hardware processing machine runtime may be used. As additional examples of the wide scope of the systems and methods, the systems and methods may allow for the use of reflection on a resource limited device through the use of the system's and method's symbolic information server. A system and method may also allow for the use of symbols on a system that does not include a traditional runtime class files, for instance by querying the symbolic information server without compromising the optimization process. Further, a system and method may provide that module code can be verified using a debugging system prior to commercial deployment of the device and/or application(s). A system and method can enable a module to combine new classes to minimize module storage size while still allowing for efficient module testing on the resource limited device.

As another example, a method and system may be configured to address the resource limitations of a mobile device when dealing with testing software and other capabilities of the device. The interfaces with which the device's consumer user interacts are typically the only interfaces provided for the mobile device. Helpful non-consumer interfaces (e.g., testing interfaces) have usually been eliminated from the mobile device because the mobile device lacks the resources to handle these interfaces. With the reduction or elimination of effective testing interfaces, mobile device developers limit themselves to using a primitive screen scraping technique. After scraping the screen, the developer would be left to inspect the scrape bit patterns to determine whether the mobile device performed the tests properly. However, the screen scraping technique can be inefficient for performing the testing task. A system and method as disclosed herein can provide an improved way for a developer to determine whether the mobile device has performed a test properly.

It is claimed:

1. An apparatus for operation upon a target mobile wireless communications device, the apparatus comprising:
   processing logic instructions configured to execute on a data processor a test program on the target mobile wireless communications device, the test program including test instructions and using a symbol that is undefined on the target device;
   wherein the undefined symbol is removed by a linking process; and
   communication logic instructions configured to execute on the data processor on the target mobile device to send the undefined symbol from the target device to a symbolic information source external to the target device, the communication logic being further operable to receive a response from the symbolic information source that includes information associated with the undefined symbol on the target device such that the processing logic is operable to complete execution of the test program.

2. The apparatus of claim 1, further comprising detection logic operable to detect whether the symbolic information source is in communication with the target device, and issue an exception if the symbolic information source is not in communication with the target device.

3. The apparatus of claim 1, wherein the symbolic information source is coupled to a compiling system, the compiling system being operable to store in a data store symbolic information related to a target program on the target device, wherein the stored symbolic information is related to at least one symbol not defined on the target system, and the symbolic information source being operable to retrieve data from the data store.

4. The apparatus of claim 1, wherein the processing logic is operable to perform:
   retrieving the test program from storage;
   performing operations specified by the test program; and
   detecting presence of said at least one symbol which is not defined on the target device.

5. The apparatus of claim 1, wherein the target device includes a virtual machine which is configured to split runtime processing with a host system, and the target device further comprises at least one module of optimized executable code.

6. The apparatus of claim 1, wherein said at least one symbol not defined on the target device comprises a field, a method, or a class;
   wherein upon completion of the test program, a reflection-based interface is used to retrieve one or more values of fields, methods, classes associated with the test for use in evaluating the test.

7. The apparatus of claim 1, wherein the test program is an automated test program directed to testing a target program on the target device, and automatically verifying results of testing the target program.

8. The apparatus of claim 1, wherein the target device is a resource constrained wireless mobile communications device.

9. The apparatus of claim 1, wherein the communication logic instructions include instructions for using a serial link to send the symbol and receive the response from the symbolic information source.

10. The apparatus of claim 1, wherein the symbolic information source is on a host device that is separate from the target mobile device.

11. The apparatus of claim 1, wherein the symbolic information source is a database.

12. The apparatus of claim 1, wherein the undefined symbol is a symbolic name of a private method, a symbolic name of a private field, or a symbolic name of a class.

13. A method of testing a target device, wherein the target device splits runtime processing with a host system, comprising:
   executing a test program on the target device, the test program comprising an ordered list of instructions and using a symbol not defined on the target device;
   wherein the symbol is removed by a linking process;
   querying a symbolic information server external to the target device with respect to the symbol not defined on the target device; and
   receiving from the symbolic information server information about the symbol not defined on the target device, which enables the target device to continue execution of the test program in order to determine whether the target device is functioning properly with respect to a test.

14. The method of claim 13, further comprising detecting at the target device the symbolic information server being communicatively coupled to the target device.

15. The method of claim 13, wherein the symbolic information server is coupled to a compiling system, the compiling system being operable to create a file comprising symbolic information related to a target program on the target device, wherein the symbolic information is associated with the undefined symbol, wherein the file is sent to the symbolic information server.

16. The method of claim 13, wherein the executing step comprises retrieving the test program from storage, performing operations specified by the test program, and detecting presence of the symbol which is not defined on the target device.

17. The method of claim 13, wherein the target device includes a virtual machine which is configured to split runtime processing with a host system, the target device using at least one module of optimized executable code.

18. The method of claim 13, wherein the symbol not defined on the target device includes a field, a method, or a class.

19. The method of claim 13, wherein the test program is an automated test program directed to testing a target program on the target device, and automatically verifying results of testing the target program.

20. Computer software stored on one or more non transitory computer readable media, the computer software comprising program code for carrying out the method according to claim 13.

21. Computer software stored on one or more non transitory computer readable media, the computer software comprising program code tested by the test program of claim 13.

22. The method of claim 13, wherein the undefined symbol is a symbolic name of a private method, a symbolic name of a private field, or a symbolic name of a class.

23. A debugging system operable for use in testing a target device, the system comprising:
- communication logic configured to execute on a data processor to receive a query from the target device external to the debugging system, the query comprising at least one symbol not defined on the target device;
- wherein said at least one symbol is removed by a linking process;
- a symbol data structure stored in memory, the symbol data structure comprising information about said at least one symbol not defined on the target device; and
- information server logic configured to execute on a data processor to retrieve information from the symbol data structure, said information regarding said at least one symbol not defined on the target device;
- the communication logic being further operable to send a response to the target device, the response comprising information about said at least on symbol not defined on the target device.

24. The debugging system of claim 23, wherein the information server logic comprises search logic operable to search said symbol data structure for said at least one symbol not defined on the target device.

25. The debugging system of claim 24, wherein said at least one symbol comprises a field, a method, or a class not defined on the target device.

26. The debugging system of claim 24, wherein the information server logic is coupled to a compiler, the compiler being operable to create said data structure, said data structure comprising symbolic information related to a target program on the target device, including symbolic information associated with said at least one undefined symbol, wherein the information server logic is operable to retrieve said symbol data structure.

27. The debugging system of claim 24, further comprising a compiler operable to convert program code into at least one optimized module, the compiler being further operable to create said symbol data structure comprising symbolic information about said at least one optimized module, the information server being operable to retrieve symbolic information from the symbol data structure.

28. The debugging system of claim 23, wherein the undefined symbol is a symbolic name of a private method, a symbolic name of a private field, or a symbolic name of a class.

\* \* \* \* \*